(12) United States Patent
Ichikawa

(10) Patent No.: US 11,951,396 B2
(45) Date of Patent: Apr. 9, 2024

(54) GAME PROGRAM, COMPUTER APPARATUS, AND GAME CONTROLLING METHOD

(71) Applicant: SQUARE ENIX CO., LTD., Tokyo (JP)

(72) Inventor: Shoichi Ichikawa, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 391 days.

(21) Appl. No.: 17/295,678

(22) PCT Filed: Nov. 28, 2018

(86) PCT No.: PCT/JP2018/043871
§ 371 (c)(1),
(2) Date: May 20, 2021

(87) PCT Pub. No.: WO2020/110246
PCT Pub. Date: Jun. 4, 2020

(65) Prior Publication Data
US 2022/0016528 A1    Jan. 20, 2022

(51) Int. Cl.
A63F 13/56    (2014.01)
A63F 13/58    (2014.01)
A63F 13/822   (2014.01)

(52) U.S. Cl.
CPC .............. *A63F 13/56* (2014.09); *A63F 13/58* (2014.09); *A63F 13/822* (2014.09)

(58) Field of Classification Search
CPC ........ A63F 13/56; A63F 13/58; A63F 13/822; A63F 13/837; A63F 13/35
See application file for complete search history.

(56) References Cited

FOREIGN PATENT DOCUMENTS

| JP | 2002-219280 A | 8/2002 |
| JP | 2009-119049 A | 6/2009 |
| JP | 2012-120755 A | 6/2012 |
| JP | 2017-055964 A | 3/2017 |

OTHER PUBLICATIONS

"Street Fighter III: 3rd Strike," 2000, Capcom, instruction manual (Year: 2000).*

(Continued)

*Primary Examiner* — Kevin Y Kim
(74) *Attorney, Agent, or Firm* — GREENBLUM & BERNSTEIN, P.L.C.

(57) ABSTRACT

An object of at least one embodiment of the present invention is to provide a game program of higher interest.
A game program controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate a specific effect advantageous for the player character.

13 Claims, 12 Drawing Sheets

CONTROL MASTER TABLE

| 501 FIRST CHARACTER | 502 CONTROL CONDITION | 503 ACTION | 504 EFFECT | 505 UNDER-CONTROL ACTION TYPE | 506 CONTROL FINISH CONDITION | 507 AFTER-CONTROL ACTION TYPE | 508 DISAPPEARING CONDITION |
|---|---|---|---|---|---|---|---|
| OSTRICH | MOUNT BY OPERATION CHARACTER | MOUNTABLE KICK IN CASE OF COMING INTO CONTACT WITH ENEMY DURING MOUNTING | — | MOVE IN SYNCHRONIZATION WITH OPERATION CHARACTER | GET OFF FROM MOUNTING | ESCAPE FROM OPERATION CHARACTER | HEALTH POWER BECOMES ZERO |
| WOLF | CAUSE HEALTH POWER TO BECOME ZERO | ATTACK IN CASE WHERE ENEMY ENTERS CERTAIN RANGE | — | FOLLOW OPERATION CHARACTER | 60 SECONDS AFTER CONTROL | DISAPPEAR | AT SAME TIME AS FINISH OF CONTROL |
| BIG EYE | WEAKEN AND CAPTURE | — | DISPLAY ENEMY CHARACTER WITHIN CERTAIN RANGE ON MAP | FOLLOW OPERATION CHARACTER | 30 SECONDS AFTER CONTROL | REMAIN IN PLACE | 40 SECONDS AFTER CONTROL |
| BOMB | CAUSE HEALTH POWER TO BECOME ZERO | EXPLODE IN CASE OF RECEIVING DAMAGE FROM ENEMY / COME CLOSE AND SELF-DESTRUCT IN CASE WHERE ENEMY ENTERS CERTAIN RANGE / SELF-DESTRUCT AT TIME OF DISAPPEARING | — | FOLLOW OPERATION CHARACTER | 45 SECONDS AFTER CONTROL or EXPLODE (SELF-DESTRUCT) | DISAPPEAR | AT SAME TIME AS FINISH OF CONTROL |
| BEHEMOTH | CAUSE HEALTH POWER TO BECOME ZERO | MOUNTABLE, DASH IN CASE OF COMING INTO CONTACT WITH ENEMY / ATTACK IN CASE WHERE ENEMY ENTERS CERTAIN RANGE | — | MOVE IN SYNCHRONIZATION WITH OPERATION CHARACTER / REMAIN IN PLACE | HEALTH POWER BECOMES ZERO | DISAPPEAR | AT SAME TIME AS FINISH OF CONTROL |
| CHARACTER OF ANOTHER PLAYER (INCLUDING AUTOMATICALLY CONTROLLED CHARACTER) | CAUSE HEALTH POWER TO BECOME ZERO AND USE ITEM AT PREDETERMINED TIMING | ATTACK IN CASE WHERE ENEMY ENTERS CERTAIN RANGE | ATTACK POWER AND DEFENSE POWER OF ALL CHARACTERS WITHIN CERTAIN RANGE DECREASE DUE TO ROTTEN ODOR | FOLLOW OPERATION CHARACTER | 60 SECONDS AFTER CONTROL or HEALTH POWER BECOMES ZERO | DISAPPEAR | AT SAME TIME AS FINISH OF CONTROL |

500

(56) References Cited

OTHER PUBLICATIONS

Judge2003, " Street Fighter III: 3rd Strike—Fight for the Future—Twelve Guide," Jul. 9, 2001, https://gamefaqs.gamespot.com/arcade/575310-street-fighter-iii-3rd-strike-fight-for-the-future/faqs/12546 (Year: 2001).*

"Super Smash Bros. Stages," Oct. 21, 2018, Nintendo, https://web.archive.org/web/20181021115235/https://www.smashbros.com/en_US/stage/ (Year: 2018).*

"Play station 2, Dragon Quest Characters: Torneko no Daiboken 3—Fushigi no Dungeon", Shueisha Inc., non-official translation (V jump books [game series], first printing), Nov. 5, 2002, pp. 19, 85-90.

"Dragon Quest Characters: Torneko no Daiboken 3—Fushigi no Dungeon", Enix Co., Ltd., (non-official translation (Play station 2 ENIX best mook library. Official guidebook, first edition, first printing), Dec. 20, 2002, pp. 22.

International Search Report issued in International Patent Application No. PCT/JP2018/043871, dated Feb. 26, 2019, along with an English translation thereof.

Written Opinion of the International Searching Authority issued in International Patent Application No. PCT/JP2018/043871, dated Feb. 26, 2019.

Japanese Office Action dated Oct. 19, 2021 issued in Japanese Patent Application No. 2020-174897 and corresponding English translation.

Japanese Office Action dated Jun. 14, 2022 issued in Japanese patent application No. 2020-174897 with corresponding English translation.

Japanese Office Action dated Aug. 30, 2022 issued in Japanese patent application No. 2020-174897 with corresponding English translation.

* cited by examiner

FIG. 8

CONTROL MASTER TABLE

| 501 FIRST CHARACTER | 502 CONTROL CONDITION | 503 ACTION | 504 EFFECT | 505 UNDER-CONTROL ACTION TYPE | 506 CONTROL FINISH CONDITION | 507 AFTER-CONTROL ACTION TYPE | 508 DISAPPEARING CONDITION |
|---|---|---|---|---|---|---|---|
| OSTRICH | MOUNT BY OPERATION CHARACTER | MOUNTABLE. KICK IN CASE OF COMING INTO CONTACT WITH ENEMY DURING MOUNTING | — | MOVE IN SYNCHRONIZATION WITH OPERATION CHARACTER | GET OFF FROM MOUNTING | ESCAPE FROM OPERATION CHARACTER | HEALTH POWER BECOMES ZERO |
| WOLF | CAUSE HEALTH POWER TO BECOME ZERO | ATTACK IN CASE WHERE ENEMY ENTERS CERTAIN RANGE | — | FOLLOW OPERATION CHARACTER | 60 SECONDS AFTER CONTROL | DISAPPEAR | AT SAME TIME AS FINISH OF CONTROL |
| BIG EYE | WEAKEN AND CAPTURE | — | DISPLAY ENEMY CHARACTER WITHIN CERTAIN RANGE ON MAP | FOLLOW OPERATION CHARACTER | 30 SECONDS AFTER CONTROL | REMAIN IN PLACE | 40 SECONDS AFTER CONTROL |
| BOMB | CAUSE HEALTH POWER TO BECOME ZERO | EXPLODE IN CASE OF RECEIVING DAMAGE FROM ENEMY. COME CLOSE AND SELF-DESTRUCT IN CASE WHERE ENEMY ENTERS CERTAIN RANGE. SELF-DESTRUCT AT TIME OF DISAPPEARING | — | FOLLOW OPERATION CHARACTER | 45 SECONDS AFTER CONTROL or EXPLODE (SELF-DESTRUCT) | DISAPPEAR | AT SAME TIME AS FINISH OF CONTROL |
| BEHEMOTH | CAUSE HEALTH POWER TO BECOME ZERO | MOUNTABLE. DASH IN CASE OF COMING INTO CONTACT WITH ENEMY. ATTACK IN CASE WHERE ENEMY ENTERS CERTAIN RANGE | — | MOVE IN SYNCHRONIZATION WITH OPERATION CHARACTER / REMAIN IN PLACE | HEALTH POWER BECOMES ZERO | DISAPPEAR | AT SAME TIME AS FINISH OF CONTROL |
| CHARACTER OF ANOTHER PLAYER (INCLUDING AUTOMATICALLY CONTROLLED CHARACTER) | CAUSE HEALTH POWER TO BECOME ZERO AND USE ITEM AT PREDETERMINED TIMING | ATTACK IN CASE WHERE ENEMY ENTERS CERTAIN RANGE | ATTACK POWER AND DEFENSE POWER OF ALL CHARACTERS WITHIN CERTAIN RANGE DECREASE DUE TO ROTTEN ODOR | FOLLOW OPERATION CHARACTER | 60 SECONDS AFTER CONTROL or HEALTH POWER BECOMES ZERO | DISAPPEAR | AT SAME TIME AS FINISH OF CONTROL |

500

GAME PROGRAM, COMPUTER APPARATUS, AND GAME CONTROLLING METHOD

TECHNICAL FIELD

The embodiment of the present invention relates to a game program, a computer apparatus, and a game controlling method.

BACKGROUND ART

In the past, for example, there has been a so-called battle royal game in which a virtual battle between characters is executed by operating one or more characters among a plurality of characters disposed in one game field, and in which ranks of players operating the characters are decided in accordance with an order of losing in the virtual battle.

SUMMARY OF INVENTION

Technical Problem

However, the game of the related art simply includes picking up an item or the like randomly disposed on the field and attacking an enemy character, and the game is likely to be monotonous. A game of high interest cannot be provided to the players.

An object of at least one embodiment of the present invention is to provide a game program, a computer apparatus, and a game control method, which have higher interest.

Solution to Problem

According to a non-limiting aspect, a game program according to the present invention is a game program executing, in a computer apparatus, a game including a virtual battle between at least one player character operated by a player and at least two or more first characters, the game program causing the computer apparatus to function as: a virtual battle executer that executes the virtual battle between the player character and the first character; and a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate, without moving in the virtual space together with the player character, a specific effect advantageous for the player character.

According to a non-limiting aspect, a computer apparatus according to the present invention is a computer apparatus executing a game including a virtual battle between at least one player character operated by a player and at least two or more first characters, the computer apparatus comprising: a virtual battle executer that executes the virtual battle between the player character and the first character; and a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate a specific effect advantageous for the player character.

According to a non-limiting aspect, a game control method according to the present invention is a game control method for controlling, in a computer apparatus, game processing including a virtual battle between at least one player character operated by a player and at least two or more first characters, the game control method comprising: a step of executing the virtual battle between the player character and the first character; and a step of controlling the first character satisfying a predetermined condition as a result of the virtual battle to automatically execute, without moving in a virtual space together with the player character, a specific action that is an action different from before a start of the virtual battle and is advantageous for the player character, or controlling the first character satisfying the predetermined condition as a result of the virtual battle to automatically generate, without moving in the virtual space together with the player character, a specific effect advantageous for the player character.

Advantageous Effects of Invention

One or more of the above problems can be solved with each embodiment of the present invention.

BRIEF DESCRIPTION OF DRAWINGS

FIG. 8 is a diagram representing the control master table corresponding to at least one embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention and does not limit the effects. Further, the order of respective processes that form a flowchart described below may be changed in a range without contradicting or creating discord with the processing contents thereof.

First Embodiment

A summary of a first embodiment of the present invention will be described. Hereinafter, a game program executing, in a computer apparatus, a game including a virtual battle between at least one player character operated by a player and at least two or more first characters will be illustratively described as the first embodiment of the present invention.

Figure 1:
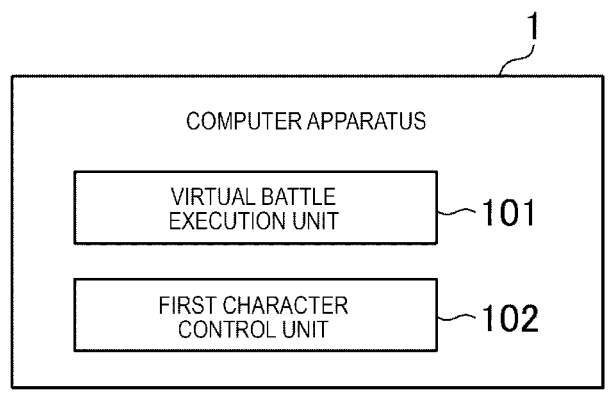
FIG. 1 is a block diagram illustrating a configuration of a computer apparatus corresponding to at least one embodiment of the present invention.

FIG. 1 is a block diagram illustrating a configuration of a computer apparatus corresponding to at least one embodiment of the present invention. A computer apparatus 1 includes at least a virtual battle execution unit 101 and a first character control unit 102.

The virtual battle execution unit 101 has a function of executing the virtual battle between the player character and the first character. The first character control unit 102 has a function of controlling the first character satisfying a predetermined condition as a result of the virtual battle to automatically execute, without moving in a virtual space together with the player character, a specific action that is an action different from before a start of the virtual battle and is advantageous for the player character, or controlling the first character satisfying the predetermined condition as a result of the virtual battle to automatically generate, without moving in the virtual space together with the player character, a specific effect advantageous for the player character.

Figure 2:
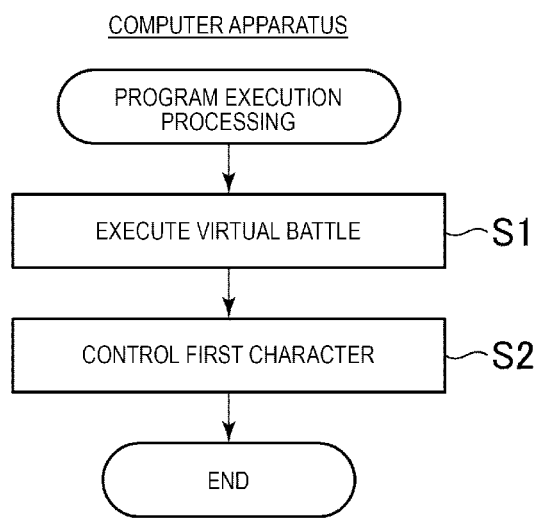
FIG. 2 is a flowchart illustrating a program execution processing corresponding to at least one embodiment of the present invention.

A program execution processing in the first embodiment of the present invention will be described. FIG. 2 is a flowchart illustrating a program execution processing corresponding to at least one embodiment of the present invention.

The computer apparatus 1, by the virtual battle execution unit 101, executes the virtual battle between the player character and the first character (step S1). The computer apparatus 1, by the first character control unit 102, controls the first character satisfying the predetermined condition as a result of the virtual battle to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S2), and terminates the program execution processing.

As one aspect of the first embodiment, a game program of higher interest can be provided.

In the first embodiment, the "computer apparatus" refers to, for example, a stationary game console, a portable game console, a wearable terminal, a desktop or laptop personal computer, a tablet computer, a server apparatus, or a PDA and may be a portable terminal such as a smartphone including a touch panel sensor on a display screen. The "first character" refers to, for example, a character that appears in the game and can perform the virtual battle, and may be a character operated by another user or a character controlled by the program.

In the first embodiment, the "game" refers to, for example, a computer game executed by starting the program in the computer apparatus, and a game content may be of any genre. The "virtual battle" refers to, for example, a virtual battle performed between characters in the virtual space in the game. For example, "moving in the virtual space together with the player character" refers to moving in synchronization with an operation character moving in accordance with an operation input of the player in the virtual space. More specifically, moving by following a movement trajectory of the operation character of the player is referred. Moving by maintaining a predetermined distance or more from the operation character, moving by roaming near the operation character, or moving that is present within the same screen is not included.

In the first embodiment, the "action different from before the start of the virtual battle" refers to, for example, a difference in action, state, circumstances, or mode before the start and after the start of the virtual battle and is more specifically exemplified by a sleeping state before the start and an awakening state after the start, a character that is sitting before the start and standing and attacking after the start, a character that is in a blue display mode before the start and changes to a red mode after the start, and the like. For example, "automatically" refers to performance independent of the operation input of the player.

Second Embodiment

Next, a summary of a second embodiment of the present invention will be described. Hereinafter, a game program executing, in a computer apparatus, a game including a virtual battle between at least one player character operated by a player and at least two or more first characters will be illustratively described as the second embodiment of the present invention.

A configuration of the computer apparatus in the second embodiment can employ a necessary scope of the block diagram of FIG. 1. In addition, a flow of program execution processing in the second embodiment can employ a necessary scope of the flowchart of FIG. 2.

Furthermore, the first character control unit 102 controls the first character to automatically execute the specific action within only a predetermined period from satisfaction of the predetermined condition by the first character, or controls the first character to automatically generate the specific effect within only the predetermined period.

As one aspect of the second embodiment, a game program of higher interest can be provided.

As one aspect of the second embodiment, by controlling the first character to automatically execute the specific action within only the predetermined period from satisfaction of the predetermined condition by the first character, or controlling the first character to automatically generate the specific effect within only the predetermined period, the player can calculate a period for which the action of the first character is executed, or a period for which the specific effect is generated, and a game program that is more strategic and of higher interest can be provided.

In the second embodiment, each of the "computer apparatus", the "game", the "first character", the "virtual battle", "moving in the virtual space together with the player character", the "action different from before the start of the virtual battle", and "automatically" can employ a necessary scope of the content disclosed in the first embodiment.

In the second embodiment, the "period" refers to, for example, a time interval set in the game or an interval corresponding to a time period in a real world.

Third Embodiment

A summary of a third embodiment of the present invention will be described. Hereinafter, a game program executing, in a computer apparatus, a game including a virtual battle between at least one player character operated by a player and at least two or more first characters will be illustratively described as the third embodiment of the present invention.

Figure 3:
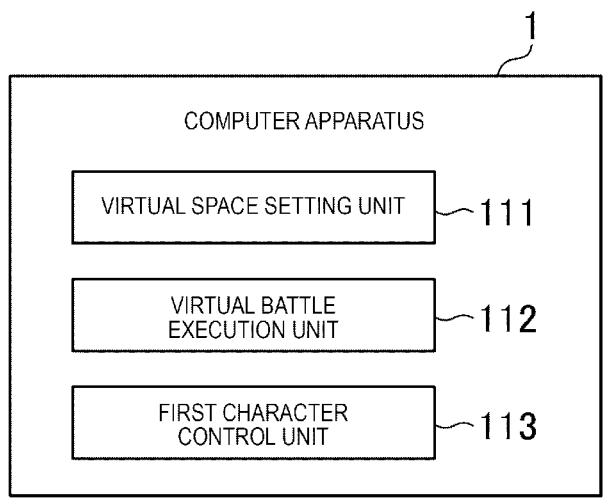
FIG. 3 is a block diagram illustrating a configuration of the computer apparatus corresponding to at least one embodiment of the present invention.

FIG. 3 is a block diagram illustrating a configuration of the computer apparatus corresponding to at least one embodiment of the present invention. The computer apparatus 1 includes at least a virtual space setting unit 111, a virtual battle execution unit 112, and a first character control unit 113.

The virtual space setting unit 111 has a function of newly setting the virtual space to be used in the game each time the game is played. The virtual battle execution unit 112 has a function of executing the virtual battle between the player character and the first character. The first character control unit 113 has a function of controlling the first character satisfying the predetermined condition as a result of the virtual battle to automatically execute, without moving in the virtual space together with the player character, the specific action that is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

Figure 4:
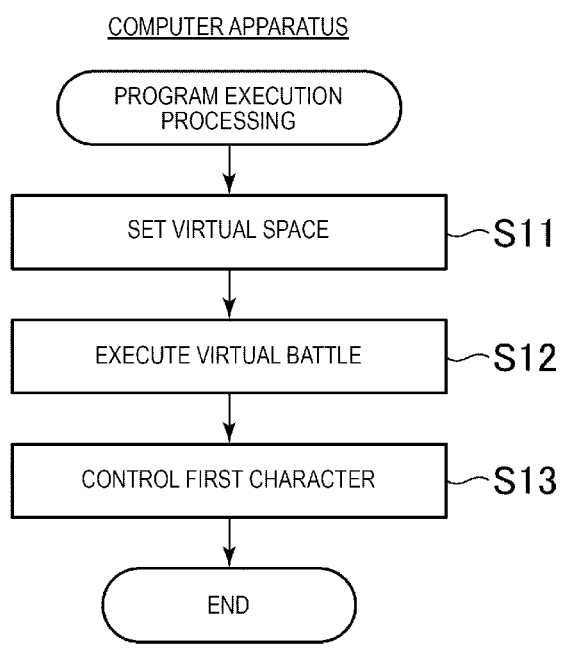
FIG. 4 is a flowchart illustrating a program execution processing corresponding to at least one embodiment of the present invention.

A program execution processing in the third embodiment of the present invention will be described. FIG. 4 is a flowchart illustrating a program execution processing corresponding to at least one embodiment of the present invention.

The computer apparatus 1, by the virtual space setting unit 111, newly sets the virtual space to be used in the game each time the game is played (step S11). The computer apparatus 1, by the virtual battle execution unit 112, executes the virtual battle between the player character and the first character (step S12). The computer apparatus 1, by the first character control unit 113, controls the first character satisfying the predetermined condition as a result of the virtual battle to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S13), and terminates the program execution processing.

As one aspect of the third embodiment, a game program of higher interest can be provided.

As one aspect of the third embodiment, by controlling the first character to automatically execute the specific action within only the predetermined period from satisfaction of the predetermined condition by the first character, or controlling the first character to automatically generate the specific effect within only the predetermined period, the player can calculate the period for which the action of the first character is executed, or the period for which the specific effect is generated, and a game program that is more strategic and of higher interest can be provided.

As one aspect of the third embodiment, by newly setting the virtual space to be used in the game each time the game is played, the game can be newly played without keeping a history of previous playing, and a game program of higher interest can be provided.

In the third embodiment, each of the "computer apparatus", the "game", the "first character", the "virtual battle", "moving in the virtual space together with the player character", the "action different from before the start of the virtual battle", and "automatically" can employ a necessary scope of the content disclosed in the first embodiment.

In the third embodiment, the "period" can employ a necessary scope of the content disclosed in the second embodiment.

In the third embodiment, "playing" refers to, for example, a unit of deciding winning or losing of the game. For example, "newly setting the virtual space" may be specifying the virtual space to be used for playing from a plurality of virtual spaces prepared in advance, or automatically generating the virtual space from basic information based on a predetermined algorithm.

Fourth Embodiment

Next, a summary of a fourth embodiment of the present invention will be described. Hereinafter, a game program executing, in a computer apparatus, a game including a virtual battle between at least one player character operated by a player and at least two or more first characters will be illustratively described as the fourth embodiment of the present invention.

Figure 5:
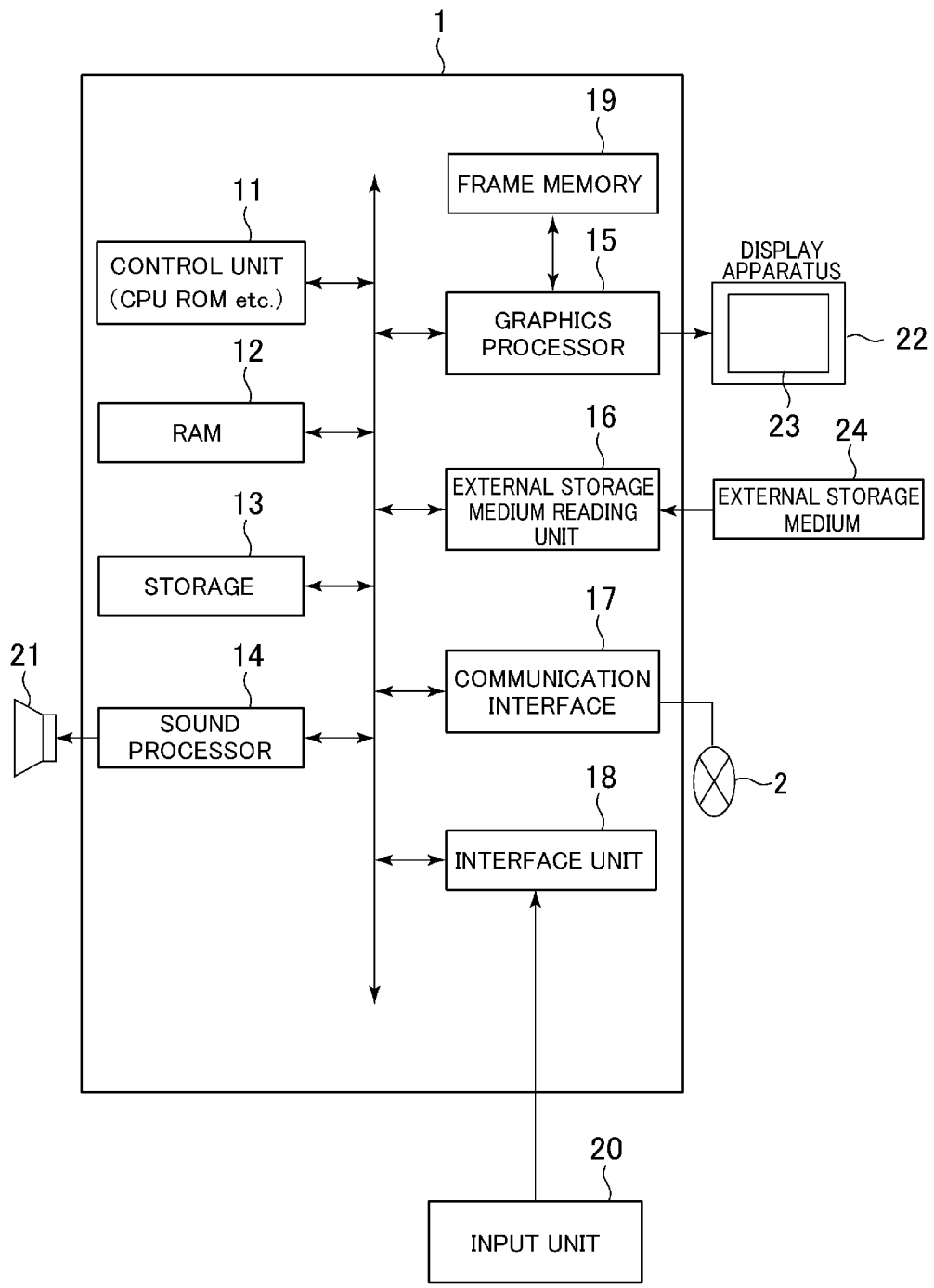
FIG. 5 is a block diagram illustrating a configuration of the computer apparatus corresponding to at least one embodiment of the present invention.

FIG. 5 is a block diagram illustrating a configuration of the computer apparatus corresponding to at least one embodiment of the present invention. The computer apparatus 1 includes at least a control unit 11, a random access memory (RAM) 12, a storage 13, a sound processor 14, a graphics processor 15, an external storage medium reading unit 16, a communication interface 17, and an interface unit 18 that are connected to each other through an internal bus.

The control unit 11 is configured with a central processing unit (CPU) and a read only memory (ROM). The control unit 11 controls the computer apparatus 1 by executing a program stored in the storage 13 or an external storage medium 24. In addition, the control unit 11 includes an internal timer that tracks time. The RAM 12 is a work area of the control unit 11. The storage 13 is a storage region for storing the program and data.

The external storage medium reading unit 16 can read the stored program from the external storage medium 24 such as a DVD-ROM, a CD-ROM, or a cartridge ROM storing the program. The external storage medium 24 stores, for example, the program and the data. The program and the data are read from the external storage medium 24 and loaded into the RAM 12 by the external storage medium reading unit 16.

The control unit 11 reads and processes the program and the data from the RAM 12. By processing the program and the data loaded in the RAM 12, the control unit 11 outputs a sound output instruction to the sound processor 14 and outputs a drawing command to the graphics processor 15.

The sound processor 14 is connected to a sound output apparatus 21 that is a speaker. In a case where the control unit 11 outputs the sound output instruction to the sound processor 14, the sound processor 14 outputs a sound signal to the sound output apparatus 21.

The graphics processor 15 is connected to a display apparatus 22. The display apparatus 22 has a display screen 23. In a case where the control unit 11 outputs the drawing command to the graphics processor 15, the graphics processor 15 loads an image into a frame memory (frame buffer) 19 and outputs a video signal for displaying the image on the display screen 23. The graphics processor 15 executes drawing of one image in units of frames. A time period of one frame of the image is, for example, 1/30 second. The graphics processor 15 has a role of distributing a load of the entire system by taking charge of a part of calculation processing related to drawing that has been performed by only the control unit 11.

An input unit 20 (for example, a mouse or a keyboard) may be connected to the interface unit 18. Input information provided from the input unit 20 by a user is stored in the RAM 12, and the control unit 11 executes various types of calculation processing based on the input information. Alternatively, it is possible to connect a storage medium reading apparatus to the interface unit 18 and read a program, data, and the like from a memory or the like. The display apparatus 22 including a touch panel can also be used as the input unit 20.

The communication interface 17 can be connected to a communication network 2 in a wireless or wired manner and transmit and receive information to and from other computer apparatuses through the communication network 2.

[Summary of Game]

Next, the game in the fourth embodiment of the present invention will be described. In the fourth embodiment, a game that progresses by providing an operation instruction to the operation character operated by the player while performing the virtual battle with an enemy character in the virtual space is exemplified as one example. As the enemy character, another player character operated by another player, an automatically controlled character participating in the game instead of the other player character, a monster attacking the operation character, the other player character, and the automatically controlled character (hereinafter, referred to as the operation character and the like) are present.

When the game is started, players to participate in the game are recruited. For example, in a case where 30 players are necessary, the game may be started in a case where 30 players join, that is, in a case where the full number of participants are gathered. Alternatively, even in a case where only 20 players are gathered at an elapse of a predetermined time period from recruitment, the game may be started with the remaining 10 players as the automatically controlled character.

In a case where the game is started, the virtual space (hereinafter, referred to as a game field) is set. An item and a treasure chest are disposed at random positions on the game field. The treasure chest stores a plurality of items. The items stored in the treasure chest may be items having higher rarity or a higher effect exhibited in the game than the item disposed on the field.

The operation character and the like can be equipped with an equipment object such as a weapon or armor. The operation character and the like may not be equipped at all at the start of the game. The operation character can be equipped with the equipment object by obtaining the item or the like disposed on the game field. The equipment object may vary in effect depending on a type, and a degree of advantageous progress of the game changes depending on the obtained item.

Parameters are set in advance for the operation character and the like. The parameters to be set may be set based on information related to a history of the game played by the player, or the same parameters may be set for all of the operation character and the like each time the game is played. In the following description, it is assumed that the same parameters are set for all of the operation character and the like each time the game is played.

The parameters set for the operation character and the like include at least health power and spiritual power. In a case where the parameter of the health power becomes zero, the operation character and the like cannot perform actions. The parameter of the spiritual power is a parameter consumed in a case of using a predetermined item. In a case where an item consuming the spiritual power is used, it is possible to execute, for example, long-range attack, area-of-effect attack, recovery of the health power of an ally, reduction of damage received from the enemy character, summoning of a character called a summoned creature, and exhibition of a predetermined effect.

[Game Mode]

The game has a solo playing mode in which the player plays alone, and a team playing mode in which two or more players form a team and fights against another team while cooperating with each other. In the team playing mode, players belonging to the same team may be not attackable.

[Finish Condition of Game]

For example, a winning condition of the game is exemplified by the health power of the other player character other than the player and the automatically controlled character becoming zero. In a case of the team playing mode, the health power of the characters belonging to the team other than the team to which the player belongs becomes zero. Such a game is referred to as a so-called battle royal game.

The winning condition may be changeable for each type of playing of the game. For example, accomplishment of, as early as possible, defeating a predetermined number of predetermined monsters, bringing a predetermined item to a predetermined region, defeating a predetermined monster (so-called boss character), or using a predetermined item a predetermined number of times is exemplified.

Meanwhile, a losing condition of the game is that, for example, the health power of the operation character of the player becomes zero. In a case of the team playing mode, the health power of all of other players and automatically controlled players belonging to the team to which the player belongs becomes zero. The losing condition may be changed in accordance with the winning condition.

In the game, only one winner or winning team may be selected. Alternatively, a time at which the losing condition is satisfied may be stored, and ranks may be determined by sorting in order of time. Points may be given to the players in accordance with the ranks in the game. By using the given points, an item for changing an appearance of the character or an in-game content such as a bonus motion picture can be used, or an item or the like for advantageous progress of the game can be used.

[Summary of Function]

Figure 6:
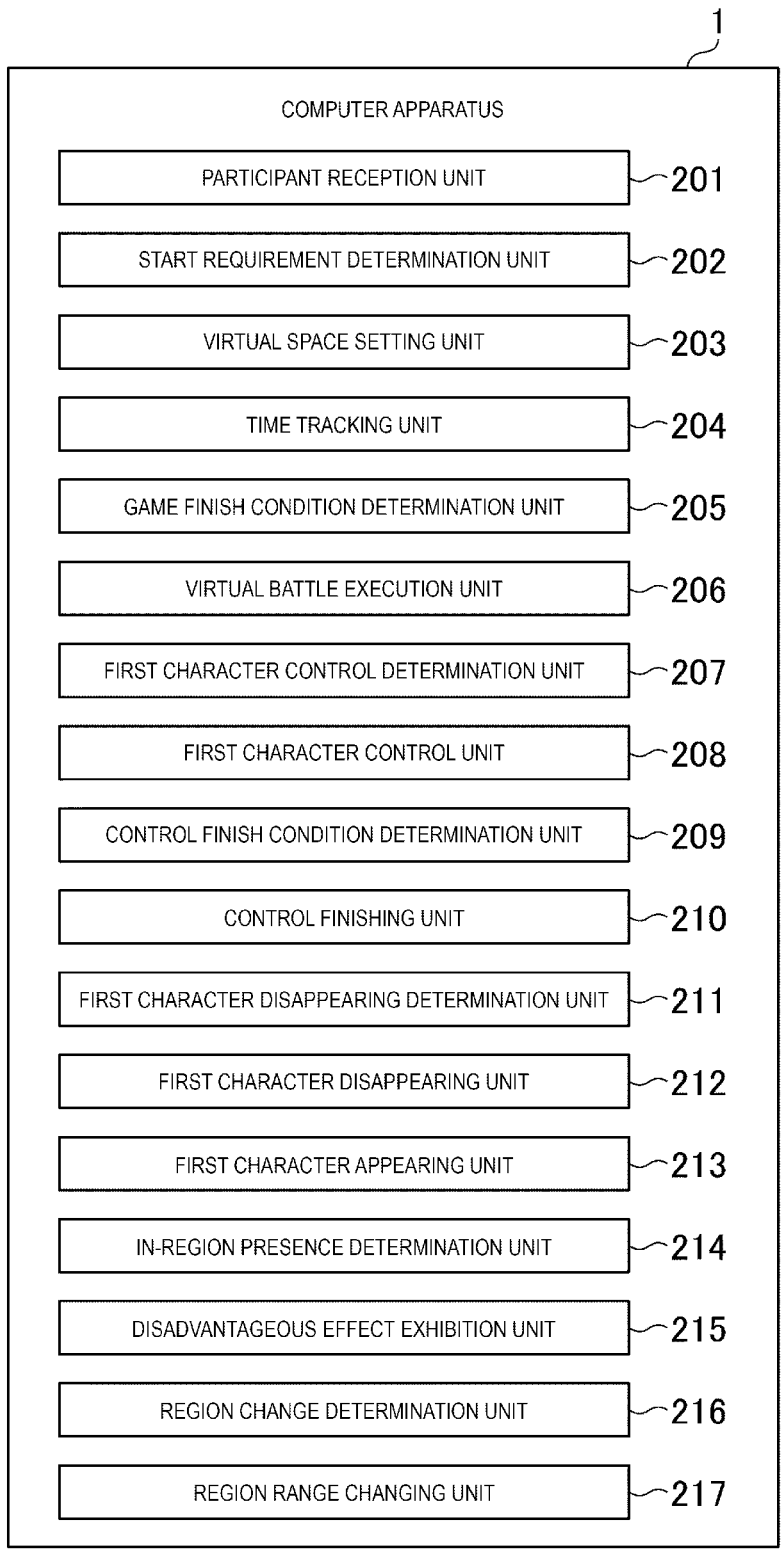
FIG. 6 is a block diagram illustrating a configuration of the computer apparatus corresponding to at least one embodiment of the present invention.

Next, a function of the program in the fourth embodiment of the present invention will be described. FIG. 6 is a block diagram illustrating a configuration of the computer apparatus corresponding to at least one embodiment of the present invention. The computer apparatus 1 includes at least a participant reception unit 201, a start requirement determination unit 202, a virtual space setting unit 203, a time tracking unit 204, a game finish condition determination unit 205, a virtual battle execution unit 206, a first character control determination unit 207, a first character control unit 208, a control finish condition determination unit 209, a control finishing unit 210, a first character disappearing determination unit 211, a first character disappearing unit 212, a first character appearing unit 213, an in-region presence determination unit 214, a disadvantageous effect exhibition unit 215, a region changing determination unit 216, and a region range changing unit 217.

The participant reception unit 201 has a function of receiving a participant in the game. The start requirement determination unit 202 has a function of determining whether or not a start requirement of the game is satisfied. The virtual space setting unit 203 has a function of newly setting the virtual space to be used in the game each time the game is played. The time tracking unit 204 has a function of tracking time. The game finish condition determination unit 205 has a function of determining whether or not a finish condition of the game is satisfied. The virtual battle execution unit 206 has a function of executing the virtual battle between the player character and the first character. The first character will be described later.

The first character control determination unit 207 has a function of determining whether or not a predetermined condition related to controllability of the first character is satisfied. The first character control unit 208 has a function of controlling the first character that is determined as satisfying the predetermined condition by the first character control determination unit 207 as a result of the virtual battle, to automatically execute, without moving in the virtual space together with the player character, the specific action which is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

The control finish condition determination unit 209 has a function of determining whether or not a predetermined condition related to finish of control performed by the first character control unit 208 is satisfied. The control finishing unit 210 has a function of finishing the action executed by the first character control unit 208 or causing the generated effect to disappear in a case where the control finish condition determination unit 209 determines that the predetermined condition is satisfied.

The first character disappearing determination unit 211 has a function of determining whether or not a predetermined condition related to disappearing of the first character controlled by the first character control unit 208 is satisfied. The first character disappearing unit 212 has a function of causing the first character controlled by the first character control unit 208 to disappear in a case where the first character disappearing determination unit 211 determines that the predetermined condition is satisfied. The first character appearing unit 213 has a function of causing a first character of the same type as the first character caused to disappear by the first character disappearing unit 212 to appear at a position different from a position at which the first character that has disappeared was present.

The in-region presence determination unit 214 has a function of determining whether or not a character is present in a predetermined region. The disadvantageous effect exhibition unit 215 has a function of exhibiting a disadvantageous effect in the game on the character that is determined as not being present in the predetermined region by the in-region presence determination unit 214.

The region changing determination unit 216 has a function of determining whether or not a predetermined condition related to the predetermined region used for determination by the in-region presence determination unit 214 is satisfied. The region range changing unit 217 has a function of changing a range of the predetermined region in a case where the region changing determination unit 216 determines that the predetermined condition is satisfied.

[Program Execution Processing]

Figure 7:
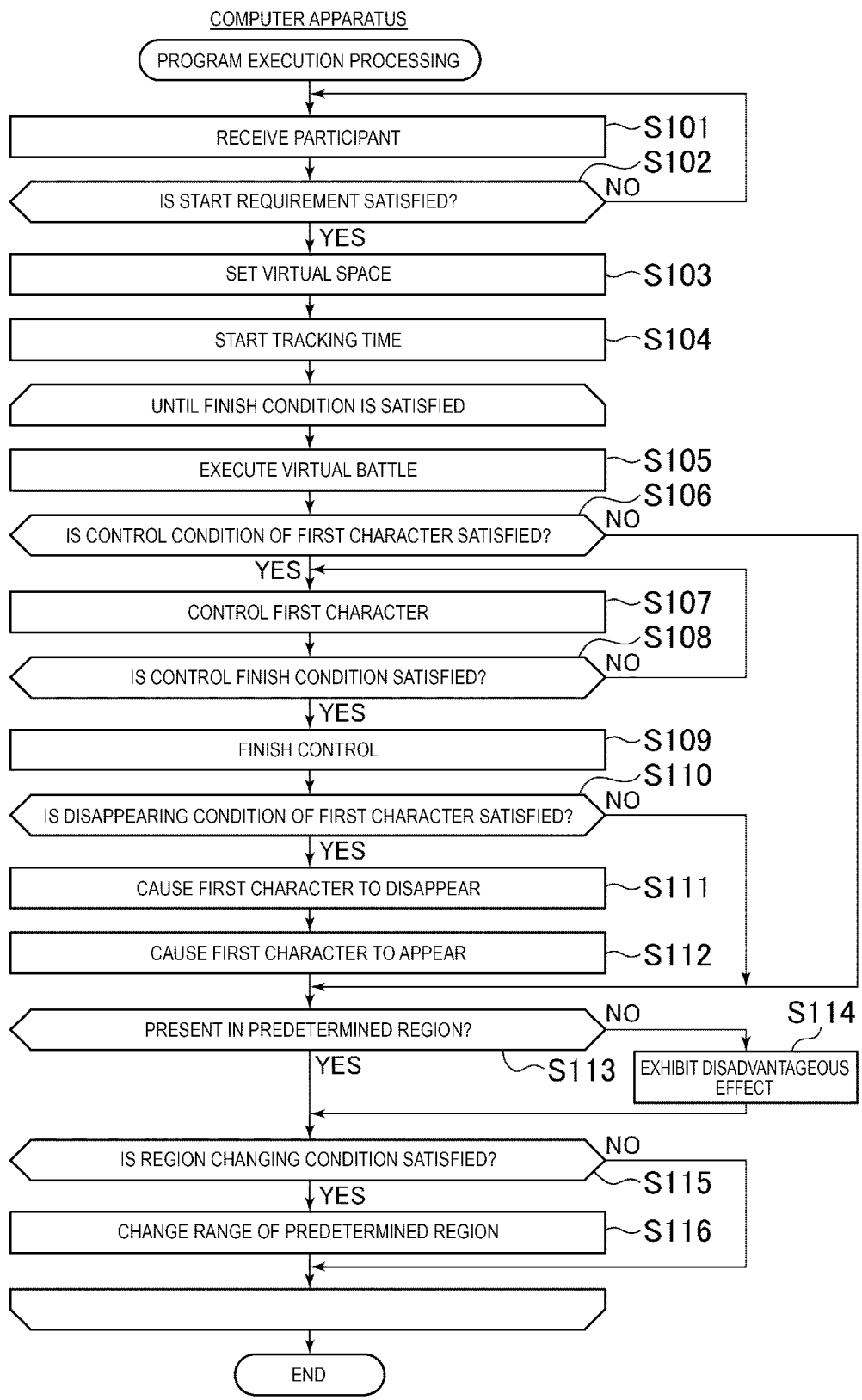
FIG. 7 is a flowchart illustrating a program execution processing corresponding to at least one embodiment of the present invention.

Next, a program execution processing in the fourth embodiment of the present invention will be described. FIG. 7 is a flowchart illustrating a program execution processing corresponding to at least one embodiment of the present invention.

In a case where the program is executed, the computer apparatus 1, by the participant reception unit 201, receives the participant in the game (step S101). The computer apparatus 1, by the start requirement determination unit 202, determines whether or not the start requirement of the game is satisfied (step S102). In a case where it is determined that the start requirement of the game is not satisfied in step S102 (NO in step S102), reception of the participant continues.

In a case where it is determined that the start requirement of the game is satisfied in step S102 (YES in step S102), the computer apparatus 1, by the virtual space setting unit 203, newly sets the virtual space to be used in the game each time the game is played (step S103). The computer apparatus 1, by the time tracking unit 204, tracks time (step S104).

The computer apparatus 1 repeats the following processing until the game finish condition determination unit 205 determines that the finish condition of the game is satisfied.

The computer apparatus 1 receives the operation instruction of the player and moves the operation character in the virtual space. In a case where the operation character and the enemy character (first character) satisfy a predetermined condition, the computer apparatus 1, by the virtual battle execution unit 206, executes the virtual battle between the player character and the first character (step S105). The first character that is a fighting opponent in the virtual battle refers to, for example, the other character operated by the other player, the automatically controlled character that is automatically controlled by the program and participates in the game instead of the other character, or a monster object that is disposed at a random position on the game field and controlled by the program.

[Start Condition of Virtual Battle]

A start condition of the virtual battle may be such that, for example, the virtual battle is started in a case where a distance between a position of the operation character and a position of the first character in the virtual space is less than or equal to a predetermined length. The embodiment of the present invention is not limited thereto. For example, a determination as to whether or not the first character is encountered may be performed using a random number for each predetermined interval (also referred to as a random encounter). Alternatively, the battle may be started in response to the first character receiving attack. Alternatively, a field of view of the character may be defined using a posture of the character, and the virtual battle may be started in a case where another character enters the field of view. Alternatively, hearing of the character may be defined, and a change to a battle mode may be made in a case where the first character notices a sound.

[Virtual Battle]

The virtual battle may be, for example, an action game performed between the operation character and the first character. Alternatively, in a case of determining an encounter with the first character, the virtual battle may be a command battle game. The present embodiment is not limited, provided that the virtual battle is a fighting game with the first character.

FIG. 7 will be revisited here. The computer apparatus 1, by the first character control determination unit 207, determines whether or not the predetermined condition related to the controllability of the first character is satisfied (step S106). For example, causing a predetermined parameter (for example, the health power or the spiritual power) of the first character to become less than or equal to a predetermined value, executing a predetermined action (for example, execute a skill such as rotation or fire breathing) on the first character a predetermined number of times, or executing a predetermined action (for example, attack with a sword a plurality of number of times, give an item, or feed) on the first character is exemplified as the predetermined condition related to the control of the first character. Examples of the predetermined condition related to the controllability of the first character are also exemplified in a control master table described later.

In a case where it is determined that the first character can be controlled (YES in step S106), the first character control unit 208 controls the first character satisfying the predetermined condition to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S107).

[Control of First Character]

FIG. 8 is a diagram representing the control master table corresponding to at least one embodiment of the present invention. A control master table 500 stores at least a control condition 502, an action 503, an effect 504, an under-control action type 505, a control finish condition 506, an after-control action type 507, and a disappearing condition 508 in association with a first character 501.

The control condition 502 is a condition for controlling the first character. The control condition is exemplified such that, like "ostrich", the first character is controlled by coming into contact with and being mounted by the operation character, controlled by causing the health power to become zero, controlled by weakening and capturing, or controlled by a combination of a plurality of conditions as in a case of causing the health power to become zero and using an item. Weakening is a state that occurs by, for example, causing the health power to become less than or equal to a predetermined threshold, causing the spiritual power to become less than or equal to a predetermined threshold, or mainly attacking a predetermined part of the first character.

The action 503 is an action executed by the first character in a case where the first character is controlled. The action executed at a time of control is an action advantageous for the operation character and, for example, may be an attack action on a second character (enemy character) or a support action on the operation character. More specifically, increasing attack power of the operation character, decreasing defense power of the enemy character, recovering the health power of the operation character, and the like are exemplified as the support action. The second character refers to, for example, a character attacking the operation character or a character for which the winning condition of the game is satisfied by causing the character to completely disappear.

The effect 504 is an effect generated by the first character in a case where the first character is controlled. The effect generated at the time of control is an effect advantageous for the operation character and may be, for example, displaying the enemy character within a certain range in a visually recognizable manner, or decreasing the parameters of the enemy character within the certain range. Both of the action 503 and the effect 504 may be set, or only one of the action 503 and the effect 504 may be set.

While a display of the enemy character is not illustrated, for example, a mark may be displayed on a map displayed on a part of a game screen. A state of the virtual space is illustrated on the map. For example, a current position of the operation character, a position of the enemy character, a location of an item, a destination, and/or the range of the predetermined region described later may be displayed on the map. The entirety or a part of the virtual space may be displayed on the map.

The under-control action type 505 is a pattern of the action executed by the first character in a case where the first character is controlled. For example, "moving in synchronization with the operation character" refers to movement of the first character in accordance with the operation instruction of the player and includes a case where the operation character mounts the first character, or where the operation character moves by riding in the first character. For example, "following the operation character" may be such that while the first character approaches by maintaining a predetermined distance to the operation character, a trajectory of movement may be randomly decided without following the operation instruction of the player. The first character may be controlled to move to enter a field of view of a virtual camera displaying a screen.

The control finish condition 506 is a condition for finishing control of the first character. The control may be released in a case where a predetermined time period elapses from the start of the control by tracking time by the time tracking unit 204. Alternatively, finish of the control may be determined depending on a parameter such as the health power, or in a case where a condition such as finish of mounting is satisfied. By acting to satisfy the control finish condition 506, the advantageous action executed by the other player or the generated advantageous effect can be finished. Thus, a more strategic game can be provided to the player.

The after-control action type 507 is a pattern of the action executed by the first character after the control of the first character is finished. For example, at the same time as the finish of the control, the first character disappears, acts to escape from the operation character, or continues remaining in place. The first character may continue following the operation character or attack the operation character.

The disappearing condition 508 is a condition for causing the controlled first character to disappear. The disappearing condition may be such that the controlled first character disappears at the same time as the finish of the control, a parameter of the controlled first character satisfies a predetermined condition, or the controlled first character disappears in a case where a predetermined time period elapses from the start of the control by tracking time by the time tracking unit 204. That is, the disappearing condition may be the same as the control finish condition or be a condition different from the control finish condition.

The flowchart of FIG. 7 will be revisited here. The computer apparatus 1, by the control finish condition determination unit 209, determines whether or not the predetermined condition related to the finish of the control performed by the first character control unit 208 is satisfied (step S108). The predetermined condition is determined by referring to the control finish condition 506 stored in the control master table 500. In a case where it is determined that the control finish condition is not satisfied (NO in step S109), the control of the first character in step S107 continues.

In a case where it is determined that the control finish condition is satisfied (YES in step S109), the computer apparatus 1 finishes the action executed by the first character control unit 208 or causes the generated effect to disappear (step S109). Then, the computer apparatus 1 controls the first character released from the control based on the action defined in the after-control action type 507.

The computer apparatus 1, by the first character disappearing determination unit 211, determines whether or not the predetermined condition related to disappearing of the first character controlled by the first character control unit 208 is satisfied (step S110). In a case where the disappearing condition of the controlled first character is not satisfied (NO in step S110), the computer apparatus 1 controls the first character released from the control based on the action defined in the after-control action type 507.

In a case where the disappearing condition of the controlled first character is satisfied (YES in step S110), the computer apparatus 1 causes the first character controlled by the first character control unit 208 to disappear (step S111). The computer apparatus 1, by the first character appearing unit 213, causes a first character of the same type as the first character caused to disappear by the first character disappearing unit 212 to appear at a position different from the position at which the first character that has disappeared was present (step S112).

Next, the computer apparatus 1, by the in-region presence determination unit 214, determines whether or not a character is present in the predetermined region (step S113). The predetermined region refers to, for example, a region that is an area called a safety zone and concentrically extends from a center. A shape of the region is not limited to a circle and may be a rectangle or other polygons or an ellipse. An outside of the region is, for example, a region filled with poisonous gas, and the disadvantageous effect in the game may be exhibited on a character present outside the region.

In a case where a character is present in the predetermined region (YES in step S113), any effect is not generated on the character. In a case where a character is present in the predetermined region (NO in step S113), the disadvantageous effect in the game is exhibited on the character (step S114). For example, instant death of the character, that is, losing in the game, decreasing the parameter of the health power or the spiritual power of the character, immobilizing the character by paralysis until being rescued by another character, and providing a monster disposed outside the region with stronger attacking means than a monster in the region are exemplified as the disadvantageous effect.

Next, the computer apparatus 1, by the region changing determination unit 216, determines whether or not the predetermined condition related to the predetermined region used for determination by the in-region presence determination unit 214 is satisfied (step S115). For example, an elapse of a predetermined time period from the start of the game and reaching of a progress status of the game to a predetermined stage such as an encounter with the boss character and discovery of a target treasure are exemplified as the predetermined condition.

In a case where the region changing determination unit 216 determines that the predetermined condition is satisfied (YES in step S115), the computer apparatus 1 changes the range of the predetermined region (step S116). The range of the region is preferably changed to be narrowed, but the range of the region may also be widened. In a case where the region changing determination unit 216 does not determine that the predetermined condition is satisfied (NO in step S115), the range of the region is maintained.

The computer apparatus 1 repeatedly executes processing of step S105 to step S116 until the finish condition of the game is satisfied. In a case where the finish condition of the game is satisfied, the computer apparatus 1 terminates the processing.

As one aspect of the fourth embodiment, a game program of higher interest can be provided.

As one aspect of the fourth embodiment, by controlling the first character to automatically execute the specific action within only the predetermined period from satisfaction of the predetermined condition by the first character, or controlling the first character to automatically generate the specific effect within only the predetermined period, the player can calculate the period for which the action of the first character is executed, or the period for which the specific effect is generated, and a game program that is more strategic and of higher interest can be provided.

As one aspect of the fourth embodiment, by newly setting the virtual space to be used in the game each time the game is played, the game can be newly played without keeping the history of previous playing, and a game program of higher interest can be provided.

As one aspect of the fourth embodiment, by causing the first character satisfying the predetermined condition to attack the second character in a case where the second character different from the first character is positioned within a predetermined range, the player is provided with new attacking means, and a game program of higher interest can be provided.

As one aspect of the fourth embodiment, by causing the first character satisfying the predetermined condition to generate the specific effect of displaying an indicator corresponding to another character on the map illustrating the state of the virtual space, a position of the other character can be easily perceived, and a game program that is more strategic and of higher interest can be provided.

As one aspect of the fourth embodiment, by causing the specific action and/or the specific effect to vary depending on the type of the first character, the player can select any first character to be controlled in accordance with the progress status of the game, and a game program that is more strategic and of higher interest can be provided.

As one aspect of the fourth embodiment, by causing the first character to disappear from the virtual space after the first character automatically executes the specific action or after the first character automatically generates the specific effect, continuously obtaining the advantage obtained from the controlled character can be prevented, and a game program of higher interest can be provided.

As one aspect of the fourth embodiment, by causing the first character to disappear from the virtual space in a case where a status of the first character satisfying the predetermined condition as a result of the virtual battle satisfies a predetermined condition, continuously obtaining the advantage obtained from the controlled character can be prevented. In addition, the player is required to cause the operation character to act to exhibit the maximum effect until the disappearing condition is satisfied, and a game program that is more strategic and of higher interest can be provided.

As one aspect of the fourth embodiment, by causing a first character of the same type as the first character that has disappeared to appear at the position different from the position at which the first character was present, the first character can be stably supplied in the virtual space, and a game program of higher interest can be provided without breaking game balance.

As one aspect of the fourth embodiment, by changing the predetermined region in accordance with an elapsed time period from the start of the virtual battle, the game can be played without loss of interest, and a game program of higher interest can be provided.

In the fourth embodiment, each of the "computer apparatus", the "game", the "first character", the "virtual battle", "moving in the virtual space together with the player character", the "action different from before the start of the virtual battle", and "automatically" can employ a necessary scope of the content disclosed in the first embodiment. The "period" can employ a necessary scope of the content disclosed in the second embodiment.

In the fourth embodiment, "playing" and "newly setting the virtual space" can employ a necessary scope of the content disclosed in the third embodiment.

In the fourth embodiment, the "second character" refers to, for example, for example, a character attacking the operation character or a character for which the winning condition of the game is satisfied by causing the character to completely disappear. The "indicator" refers to, for example, a mark, a text, a symbol, or a sign. For example, "disappearing" refers to exclusion from the virtual space and disappearing also includes a stoppage state of an object where the object is displayed but not controlled.

Fifth Embodiment

A summary of a fifth embodiment of the present invention will be described. Hereinafter, a game program executed in a server apparatus of a game system that includes a terminal apparatus and the server apparatus capable of communicating with the terminal apparatus, and executes a game including a virtual battle between at least one player character operated by a player and at least two or more first characters will be illustratively described as the fifth embodiment of the present invention.

Figure 9:
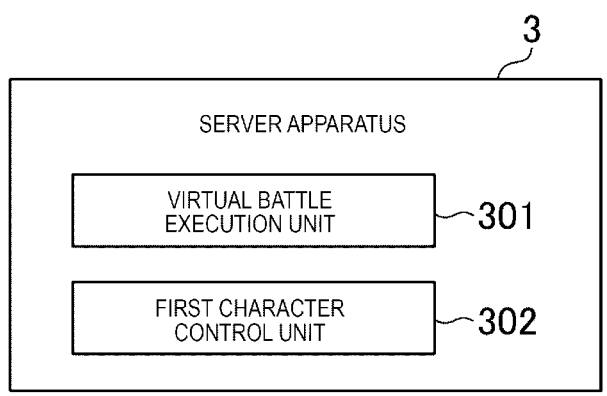
FIG. 9 is a block diagram illustrating a configuration of the server apparatus corresponding to at least one embodiment of the present invention.

FIG. 9 is a block diagram illustrating a configuration of the server apparatus corresponding to at least one embodiment of the present invention. A server apparatus 3 includes at least a virtual battle execution unit 301 and a first character control unit 302.

The virtual battle execution unit 301 has a function of executing the virtual battle between the player character and the first character. The first character control unit 302 has a function of controlling the first character satisfying the predetermined condition as a result of the virtual battle to automatically execute, without moving in the virtual space together with the player character, the specific action that is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

Figure 10:
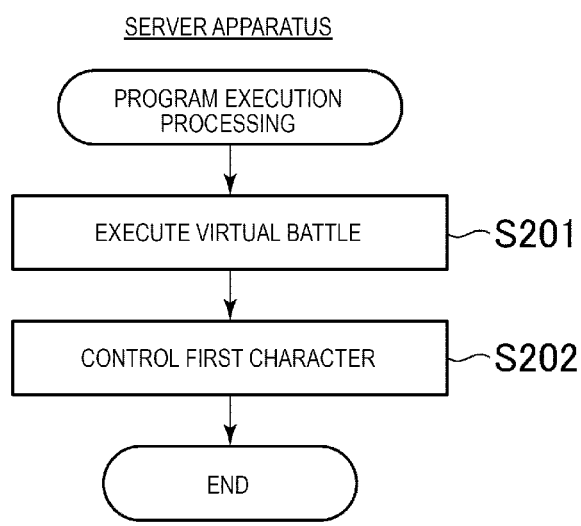
FIG. 10 is a flowchart illustrating a program execution processing corresponding to at least one embodiment of the present invention.

A program execution processing in the fifth embodiment of the present invention will be described. FIG. 10 is a flowchart illustrating a program execution processing corresponding to at least one embodiment of the present invention.

The server apparatus 3, by the virtual battle execution unit 301, executes the virtual battle between the player character and the first character (step S201). The server apparatus 3, by the first character control unit 302, controls the first character satisfying the predetermined condition as a result of the virtual battle to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S202), and terminates the program execution processing.

As one aspect of the fifth embodiment, a game program of higher interest can be provided.

In the fifth embodiment, each of the "game", the "first character", the "virtual battle", "moving in the virtual space together with the player character", the "action different from before the start of the virtual battle", and "automatically" can employ a necessary scope of the content disclosed in the first embodiment.

In the fifth embodiment, the "terminal apparatus" refers to, for example, a stationary game console, a portable game console, a wearable terminal, a desktop or laptop personal computer, a tablet computer, or a PDA and may be a portable terminal such as a smartphone including a touch panel sensor on a display screen. The "system" refers to, for example, a combination of hardware, software, a network, and the like.

Sixth Embodiment

A summary of a sixth embodiment of the present invention will be described. Hereinafter, a game system that includes a terminal apparatus and a server apparatus capable of communicating with the terminal apparatus, and executes a game including a virtual battle between at least one player character operated by a player and at least two or more first characters will be illustratively described as the sixth embodiment of the present invention.

Figure 11:
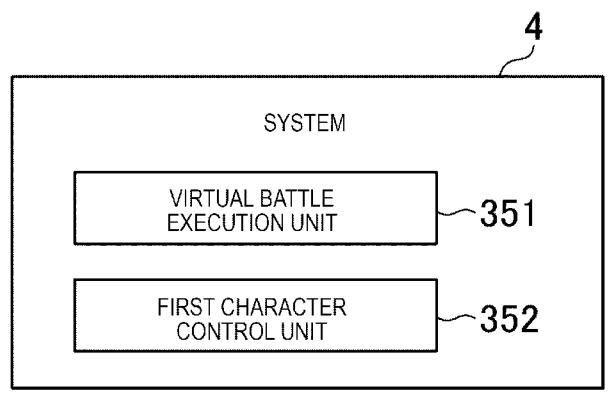
FIG. 11 is a block diagram illustrating a configuration of the system corresponding to at least one embodiment of the present invention.

FIG. 11 is a block diagram illustrating a configuration of the system corresponding to at least one embodiment of the present invention. A system 4 includes at least a virtual battle execution unit 351 and a first character control unit 352.

The virtual battle execution unit 351 has a function of executing the virtual battle between the player character and the first character. The first character control unit 352 has a function of controlling the first character satisfying the predetermined condition as a result of the virtual battle to automatically execute, without moving in the virtual space together with the player character, the specific action that is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

Figure 12:
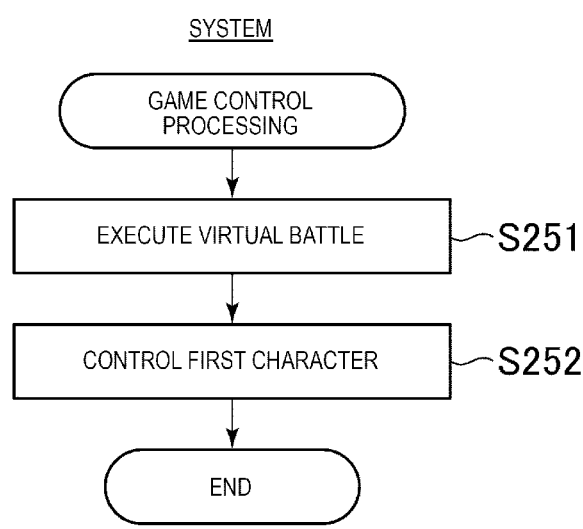
FIG. 12 is a flowchart illustrating the game control processing corresponding to at least one embodiment of the present invention.

A game control processing in the sixth embodiment of the present invention will be described. FIG. 12 is a flowchart illustrating the game control processing corresponding to at least one embodiment of the present invention.

The system 4, by the virtual battle execution unit 351, executes the virtual battle between the player character and the first character (step S251). The system 4, by the first character control unit 352, controls the first character satisfying the predetermined condition as a result of the virtual battle to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S252), and terminates the game control processing.

As one aspect of the sixth embodiment, a game program of higher interest can be provided.

In the sixth embodiment, each of the "game", the "first character", the "virtual battle", "moving in the virtual space together with the player character", the "action different from before the start of the virtual battle", and "automatically" can employ a necessary scope of the content disclosed in the first embodiment. In the sixth embodiment, each of the "terminal apparatus" and the "system" can employ a necessary scope of the content disclosed in the fifth embodiment.

Seventh Embodiment

A summary of a seventh embodiment of the present invention will be described. Hereinafter, a game program executed in a terminal apparatus of a game system that includes a terminal apparatus and a server apparatus capable of communicating with the terminal apparatus, and executes a game including a virtual battle between at least one player character operated by a player and at least two or more first characters will be illustratively described as the seventh embodiment of the present invention.

Figure 13:
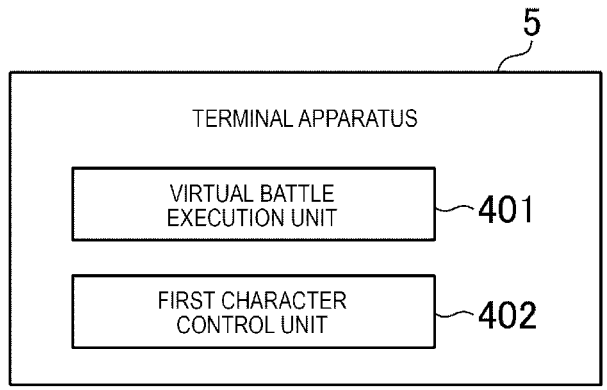
FIG. 13 is a block diagram illustrating a configuration of the terminal apparatus corresponding to at least one embodiment of the present invention.

FIG. 13 is a block diagram illustrating a configuration of the terminal apparatus corresponding to at least one embodiment of the present invention. A terminal apparatus 5 includes at least a virtual battle execution unit 401 and a first character control unit 402.

The virtual battle execution unit 401 has a function of executing the virtual battle between the player character and the first character. The first character control unit 402 has a function of controlling the first character satisfying the predetermined condition as a result of the virtual battle to automatically execute, without moving in the virtual space together with the player character, the specific action that is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

Figure 14:
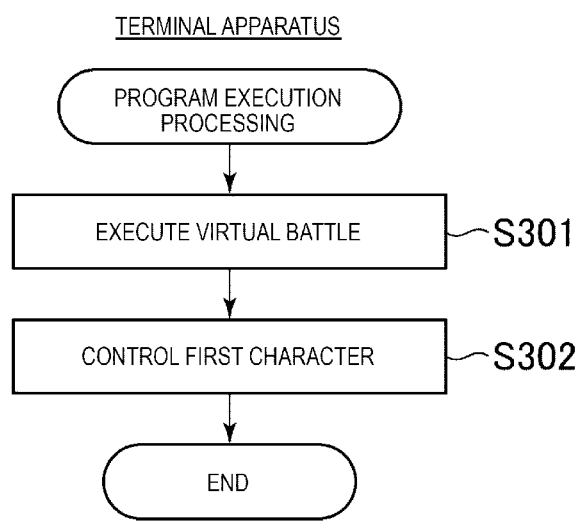
FIG. 14 is a flowchart illustrating a program execution processing corresponding to at least one embodiment of the present invention.

A program execution processing in the seventh embodiment of the present invention will be described. FIG. 14 is a flowchart illustrating a program execution processing corresponding to at least one embodiment of the present invention.

The terminal apparatus 5, by the virtual battle execution unit 401, executes the virtual battle between the player character and the first character (step S301). The terminal apparatus 5, by the first character control unit 402, controls the first character satisfying the predetermined condition as a result of the virtual battle to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S302), and terminates the program execution processing.

As one aspect of the seventh embodiment, a game program of higher interest can be provided.

In the seventh embodiment, each of the "game", the "first character", the "virtual battle", "moving in the virtual space together with the player character", the "action different from before the start of the virtual battle", and "automatically" can employ a necessary scope of the content disclosed in the first embodiment. In the seventh embodiment, each of the "terminal apparatus" and the "system" can employ a necessary scope of the content disclosed in the fifth embodiment.

Eighth Embodiment

A summary of an eighth embodiment of the present invention will be described. Hereinafter, a game system that includes a terminal apparatus and a server apparatus capable of communicating with the terminal apparatus, and executes a game including a virtual battle between at least one player character operated by a player and at least two or more first characters will be illustratively described as the eighth embodiment of the present invention.

Figure 15:
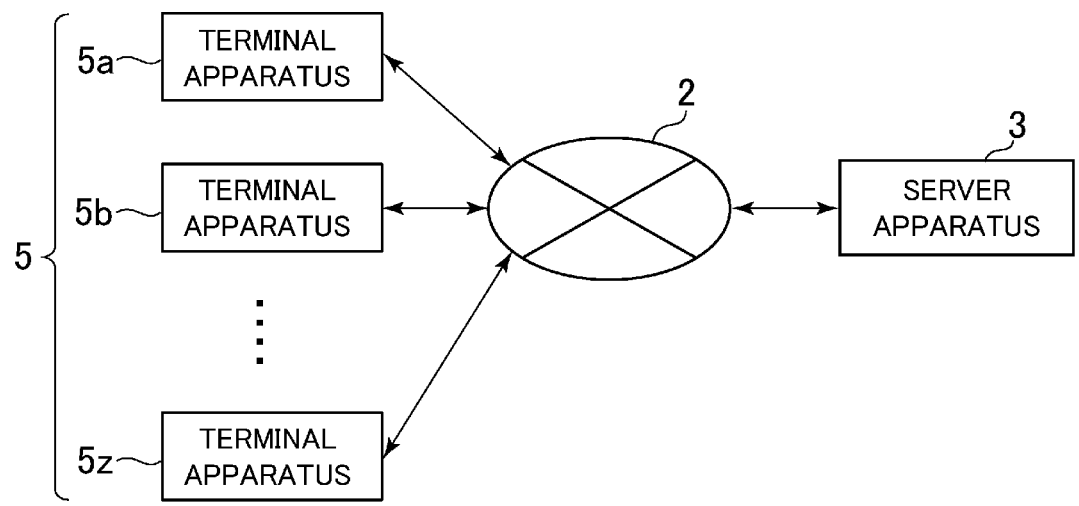
FIG. 15 is a block diagram illustrating a configuration of the system corresponding to at least one embodiment of the present invention.

FIG. 15 is a block diagram illustrating a configuration of the system corresponding to at least one embodiment of the present invention. As illustrated, the system 4 is configured with a plurality of the terminal apparatuses 5 (terminal apparatuses 5a, 5b, . . . , 5z) operated by a plurality of users (users A, B, . . . , Z), the communication network 2, and the server apparatus 3. The terminal apparatuses 5 are connected to the server apparatus 3 through the communication network 2. The terminal apparatuses 5 and the server apparatus 3 may not be connected at all times and can be connected as necessary.

Figure 16:
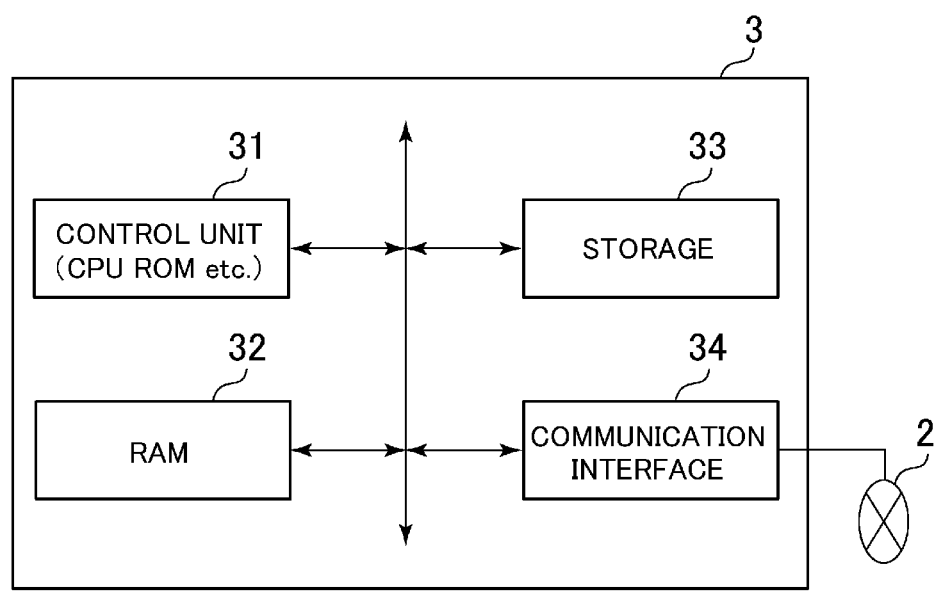
FIG. 16 is a block diagram illustrating a configuration of the server apparatus corresponding to at least one embodiment of the present invention.

FIG. 16 is a block diagram illustrating a configuration of the server apparatus corresponding to at least one embodiment of the present invention. The server apparatus 3 includes a control unit 31, a RAM 32, a storage 33, and a communication interface 34 that are connected to each other through an internal bus.

The control unit 31 is configured with a CPU and a ROM and controls the server apparatus 3 by executing a program stored in the storage 33. In addition, the control unit 31 includes an internal timer that tracks time. The RAM 32 is a work area of the control unit 31. The storage 33 is a storage region for storing the program and data. The control unit 31 reads the program and the data from the RAM 32 and executes a program execution processing based on request information received from the terminal apparatuses 5. The communication interface 34 can be connected to the communication network 2 in a wireless or wired manner and receive data through the communication network 2. The data received through the communication interface 34 is loaded into the RAM 32, and calculation processing is performed on the data by the control unit 31.

A configuration of the terminal apparatus can employ a necessary scope of the content related to the configuration of the computer apparatus disclosed in FIG. 5. Each of a summary of the game, the game mode, the finish condition of the game, the start condition of the virtual battle, and the virtual battle in the eighth embodiment of the present invention can employ a necessary scope of the content disclosed in the fourth embodiment.

[Summary of Function]

Figure 17:
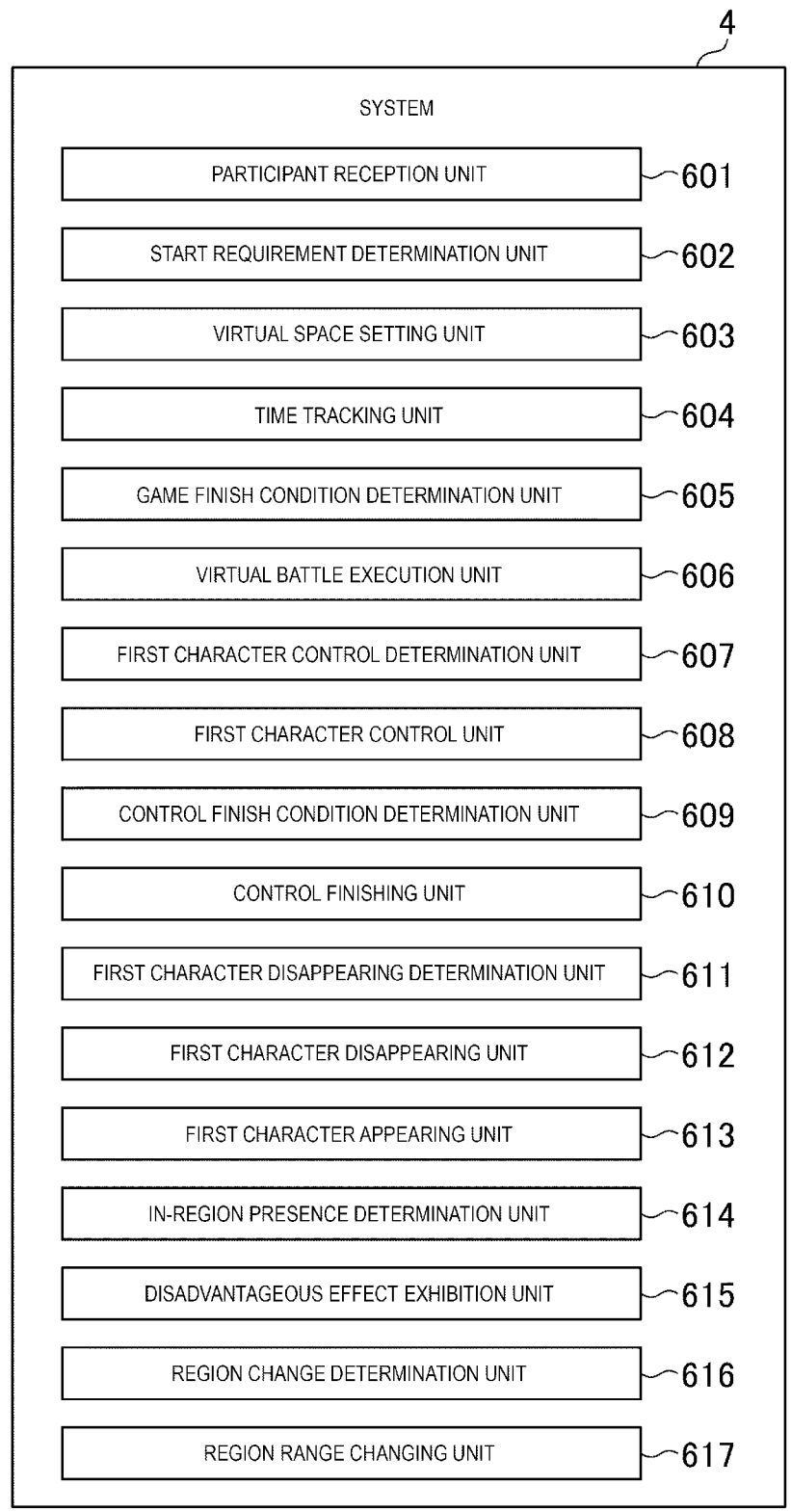
FIG. 17 is a block diagram illustrating a configuration of the system corresponding to at least one embodiment of the present invention.

Next, a function of the system in the eighth embodiment of the present invention will be described. FIG. 17 is a block diagram illustrating a configuration of the system corresponding to at least one embodiment of the present invention. The system 4 includes at least a participant reception unit 601, a start requirement determination unit 602, a virtual space setting unit 603, a time tracking unit 604, a game finish condition determination unit 605, a virtual battle execution unit 606, a first character control determination unit 607, a first character control unit 608, a control finish condition determination unit 609, a control finishing unit 610, a first character disappearing determination unit 611, a first character disappearing unit 612, a first character appearing unit 613, an in-region presence determination unit 614, a disadvantageous effect exhibition unit 615, a region changing determination unit 616, and a region range changing unit 617.

The participant reception unit 601 has a function of receiving the participant in the game. The start requirement determination unit 602 has a function of determining whether or not the start requirement of the game is satisfied. The virtual space setting unit 603 has a function of newly setting the virtual space to be used in the game each time the game is played. The time tracking unit 604 has a function of tracking time. The game finish condition determination unit 605 has a function of determining whether or not the finish condition of the game is satisfied. The virtual battle execution unit 606 has a function of executing the virtual battle between the player character and the first character. The first character will be described later.

The first character control determination unit 607 has a function of determining whether or not the predetermined condition related to the controllability of the first character is satisfied. The first character control unit 608 has a function of controlling the first character that is determined as satisfying the predetermined condition by the first character control determination unit 607 as a result of the virtual battle, to automatically execute, without moving in the virtual space together with the player character, the specific action which is the action different from before the start of the virtual battle and is advantageous for the player character, or controlling the first character satisfying the predetermined condition as a result of the virtual battle to automatically generate, without moving in the virtual space together with the player character, the specific effect advantageous for the player character.

The control finish condition determination unit 609 has a function of determining whether or not the predetermined condition related to the finish of control performed by the first character control unit 608 is satisfied. The control finishing unit 610 has a function of finishing the action executed by the first character control unit 608 or causing the generated effect to disappear in a case where the control finish condition determination unit 609 determines that the predetermined condition is satisfied.

The first character disappearing determination unit 611 has a function of determining whether or not the predetermined condition related to disappearing of the first character controlled by the first character control unit 608 is satisfied. The first character disappearing unit 612 has a function of causing the first character controlled by the first character control unit 608 to disappear in a case where the first character disappearing determination unit 611 determines that the predetermined condition is satisfied. The first character appearing unit 613 has a function of causing a first character of the same type as the first character caused to disappear by the first character disappearing unit 612 to appear at the position different from the position at which the first character that has disappeared was present.

The in-region presence determination unit 614 has a function of determining whether or not a character is present in the predetermined region. The disadvantageous effect exhibition unit 615 has a function of exhibiting the disadvantageous effect in the game on the character that is determined as not being present in the predetermined region by the in-region presence determination unit 614.

The region changing determination unit 616 has a function of determining whether or not the predetermined condition related to the predetermined region used for determination by the in-region presence determination unit 614 is satisfied. The region range changing unit 617 has a function of changing the range of the predetermined region in a case where the region changing determination unit 616 determines that the predetermined condition is satisfied.

[Game Control Processing]

Figure 18:
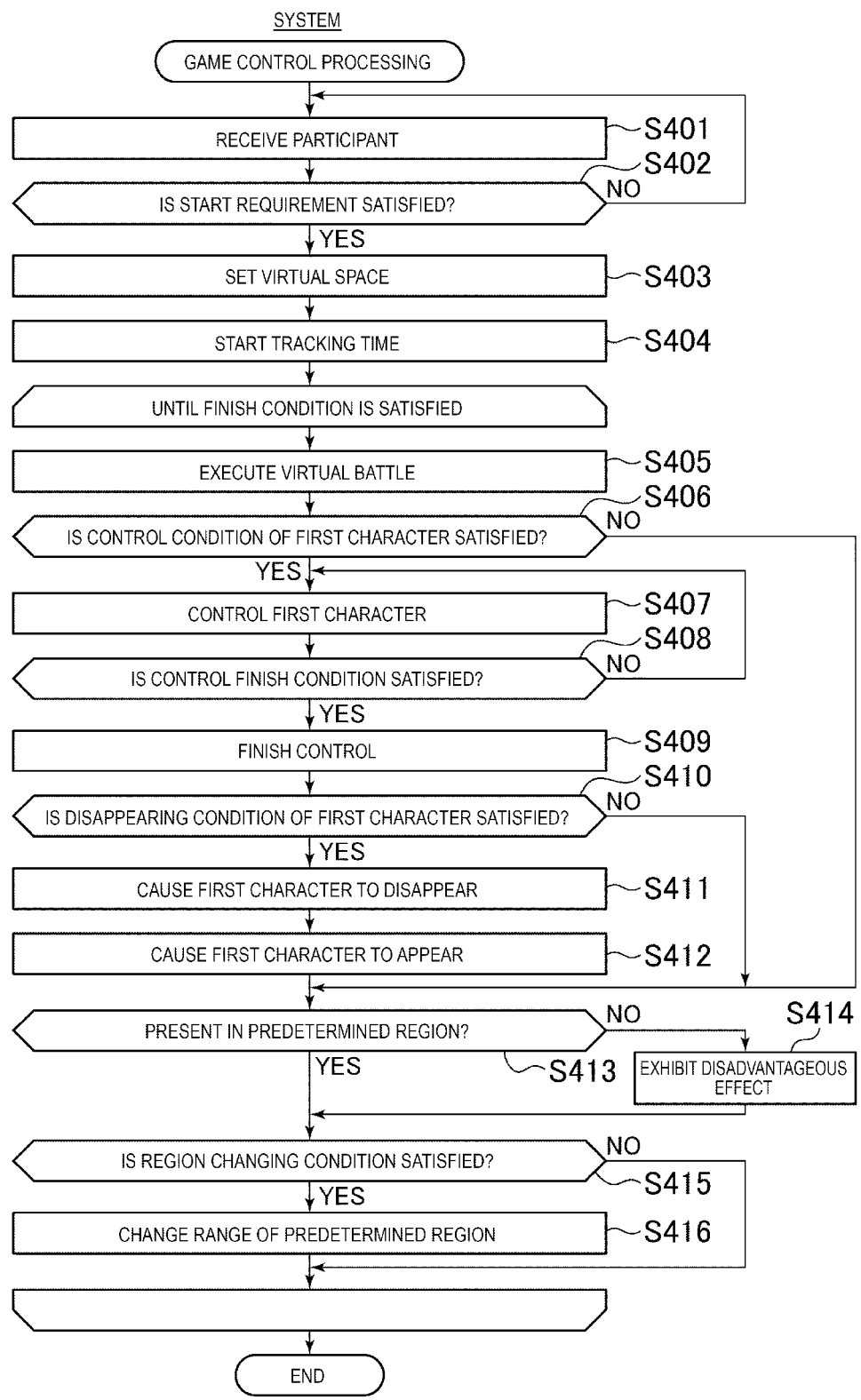
FIG. 18 is a flowchart illustrating the game control processing corresponding to at least one embodiment of the present invention.

Next, a game control processing in the eighth embodiment of the present invention will be described. FIG. 18 is a flowchart illustrating the game control processing corresponding to at least one embodiment of the present invention.

The system 4, by the participant reception unit 601, receives the participant in the game (step S401). The system 4, by the start requirement determination unit 602, determines whether or not the start requirement of the game is satisfied (step S402). In a case where it is determined that the start requirement of the game is not satisfied in step S402 (NO in step S402), reception of the participant continues.

In a case where it is determined that the start requirement of the game is satisfied in step S402 (YES in step S402), the system 4, by the virtual space setting unit 603, newly sets the virtual space to be used in the game each time the game is played (step S403). The system 4, by the time tracking unit 604, tracks time (step S404).

The system 4 repeats the following processing until the game finish condition determination unit 605 determines that the finish condition of the game is satisfied.

The system 4 receives the operation instruction of the player and moves the operation character in the virtual space. In a case where the operation character and the enemy character (first character) satisfy the predetermined condition, the system 4, by the virtual battle execution unit 606, executes the virtual battle between the player character and the first character (step S405). The first character that is a fighting opponent in the virtual battle refers to, for example, the other character operated by the other player, the automatically controlled character that is automatically controlled by the program and participates in the game instead of the other character, or the monster object that is disposed at a random position on the game field and controlled by the program.

The system 4, by the first character control determination unit 607, determines whether or not the predetermined condition related to the controllability of the first character is satisfied (step S406). The predetermined condition related to the control of the first character refers to, for example, causing a predetermined parameter (for example, the health power or the spiritual power) of the first character to become less than or equal to a predetermined value, executing a predetermined action (for example, execute a skill such as rotation or fire breathing) on the first character a predetermined number of times, or executing a predetermined action (for example, attack with a sword a plurality of number of times, give an item, or feed) on the first character.

In a case where it is determined that the first character can be controlled (YES in step S406), the first character control unit 608 controls the first character satisfying the predetermined condition to automatically execute, without moving in the virtual space together with the player character, the specific action which is the action different from before the start of the virtual battle and is advantageous for the player character, or controls the first character satisfying the predetermined condition as a result of the virtual battle to automatically generate, without moving in the virtual space together with the player character, the specific effect advantageous for the player character (step S407). The control of the first character can employ a necessary scope of the content disclosed in the fourth embodiment and the content of FIG. 8.

The system 4, by the control finish condition determination unit 609, determines whether or not the predetermined condition related to the finish of the control performed by the first character control unit 608 is satisfied (step S408). The predetermined condition is determined by referring to the control finish condition 506 stored in the control master table 500. In a case where it is determined that the control finish condition is not satisfied (NO in step S409), the control of the first character in step S407 continues.

In a case where it is determined that the control finish condition is satisfied (YES in step S409), the system 4 finishes the action executed by the first character control unit 608 or causes the generated effect to disappear (step S409). Then, the system 4 controls the first character released from the control based on the action defined in the after-control action type 507.

The system 4, by the first character disappearing determination unit 611, determines whether or not the predetermined condition related to disappearing of the first character controlled by the first character control unit 608 is satisfied (step S410). In a case where the disappearing condition of the controlled first character is not satisfied (NO in step S410), the system 4 controls the first character released from the control based on the action defined in the after-control action type 507.

In a case where the disappearing condition of the controlled first character is satisfied (YES in step S410), the system 4 causes the first character controlled by the first character control unit 608 to disappear (step S411). The system 4, by the first character appearing unit 613, causes a first character of the same type as the first character caused to disappear by the first character disappearing unit 612 to appear at the position different from the position at which the first character that has disappeared was present (step S412).

Next, the system 4, by the in-region presence determination unit 614, determines whether or not a character is present in the predetermined region (step S413). The predetermined region is, for example, a region that is an area called a safety zone and concentrically extends from a center. The shape of the region is not limited to a circle and may be a rectangle or other polygons or an ellipse. The outside of the region is, for example, a region filled with poisonous gas, and the disadvantageous effect in the game may be exhibited on a character present outside the region.

In a case where a character is present in the predetermined region (YES in step S413), any effect is not generated on the character. In a case where a character is present in the predetermined region (NO in step S413), the disadvantageous effect in the game is exhibited on the character (step S414). For example, instant death of the character, that is, losing in the game, decreasing the parameter of the health power or the spiritual power of the character, immobilizing the character by paralysis until being rescued by another character, and providing a monster disposed outside the region with stronger attacking means than a monster in the region are exemplified as the disadvantageous effect.

Next, the system 4, by the region changing determination unit 616, determines whether or not the predetermined condition related to the predetermined region used for determination by the in-region presence determination unit 614 is satisfied (step S415). For example, the elapse of the predetermined time period from the start of the game and reaching of the progress status of the game to the predetermined stage such as an encounter with the boss character and discovery of the target treasure are exemplified as the predetermined condition.

In a case where the region changing determination unit 616 determines that the predetermined condition is satisfied (YES in step S415), the system 4 changes the range of the predetermined region (step S416). The range of the region is preferably changed to be narrowed, but the range of the region may also be widened. In a case where the region changing determination unit 616 does not determine that the predetermined condition is satisfied (NO in step S415), the range of the region is maintained.

The system 4 repeatedly executes the processing of step S405 to step S416 until the finish condition of the game is satisfied. In a case where the finish condition of the game is satisfied, the system 4 terminates processing.

As one aspect of the eighth embodiment, a game system of higher interest can be provided.

As one aspect of the eighth embodiment, by controlling the first character to automatically execute the specific action within only the predetermined period from satisfaction of the predetermined condition by the first character, or controlling the first character to automatically generate the specific effect within only the predetermined period, the player can calculate the period for which the action of the first character is executed, or the period for which the specific effect is generated, and a game system that is more strategic and of higher interest can be provided.

As one aspect of the eighth embodiment, by newly setting the virtual space to be used in the game each time the game is played, the game can be newly played without keeping the history of previous playing, and a game system of higher interest can be provided.

As one aspect of the eighth embodiment, by causing the first character satisfying the predetermined condition to attack the second character in a case where the second character different from the first character is positioned within the predetermined range, the player is provided with new attacking means, and a game system of higher interest can be provided.

As one aspect of the eighth embodiment, by causing the first character satisfying the predetermined condition to generate the specific effect of displaying the indicator corresponding to the other character on the map illustrating the state of the virtual space, the position of the other character can be easily perceived, and a game system that is more strategic and of higher interest can be provided.

As one aspect of the eighth embodiment, by causing the specific action and/or the specific effect to vary depending on the type of the first character, the player can select any first character to be controlled in accordance with the progress status of the game, and a game system that is more strategic and of higher interest can be provided.

As one aspect of the eighth embodiment, by causing the first character to disappear from the virtual space after the first character automatically executes the specific action or after the first character automatically generates the specific effect, continuously obtaining the advantage obtained from the controlled character can be prevented, and a game system of higher interest can be provided.

As one aspect of the eighth embodiment, by causing the first character to disappear from the virtual space in a case where a status of the first character satisfying the predetermined condition as a result of the virtual battle satisfies the predetermined condition, continuously obtaining the advantage obtained from the controlled character can be prevented. In addition, the player is required to cause the operation character to act to exhibit the maximum effect until the disappearing condition is satisfied, and a game system that is more strategic and of higher interest can be provided.

As one aspect of the eighth embodiment, by causing a first character of the same type as the first character that has disappeared to appear at the position different from the position at which the first character was present, the first character can be stably supplied in the virtual space, and a game system of higher interest can be provided without breaking game balance.

As one aspect of the eighth embodiment, by changing the predetermined region in accordance with the elapsed time period from the start of the virtual battle, the game can be played without loss of interest, and a game system of higher interest can be provided.

In the eighth embodiment, each of the "game", the "first character", the "virtual battle", "moving in the virtual space together with the player character", the "action different from before the start of the virtual battle", and "automatically" can employ a necessary scope of the content disclosed in the first embodiment. The "period" can employ a necessary scope of the content disclosed in the second embodiment.

In the eighth embodiment, "playing" and "newly setting the virtual space" can employ a necessary scope of the content disclosed in the third embodiment.

In the eighth embodiment, the "second character" and the "indicator" can employ a necessary scope of the content disclosed in the fourth embodiment. In the eighth embodiment, the "terminal apparatus" and the "system" can employ a necessary scope of the content disclosed in the fifth embodiment.

APPENDIX

The above-described embodiments have been described so that those skilled in the art can implement the following invention.

[1] A game program executing, in a computer apparatus, a game including a virtual battle between at least one player character operated by a player and at least two or more first characters, the game program causing the computer apparatus to function as:

a virtual battle executer that executes the virtual battle between the player character and the first character; and a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate, without moving in the virtual space together with the player character, a specific effect advantageous for the player character.

[2] The game program according to [1], wherein the first character controller controls the first character to automatically execute the specific action within only a predetermined period from satisfaction of the predetermined condition by the first character, or controls the first character to automatically generate the specific effect within only the predetermined period.

[3] The game program according to [1] or [2], further causing the computer apparatus to function as:

a virtual space setter that newly sets the virtual space to be used in the game each time the game is played.

[4] The game program according to any one of [1] to [3], wherein in a case where a second character different from the first character satisfying the predetermined condition is positioned within a predetermined range, the specific action is attacking the second character by the first character.

[5] The game program according to any one of [1] to [4], wherein the specific effect is displaying an indicator corresponding to another character on a map illustrating a state of the virtual space.

[6] The game program according to any one of [1] to [5], wherein the specific action and/or the specific effect varies depending on a type of the first character.

[7] The game program according to any one of [1] to [6], further causing the computer apparatus to function as:

a first disappearer that causes the first character to disappear from the virtual space after the first character automatically executes the specific action, or after the first character automatically generates the specific effect.

[8] The game program according to any one of [1] to [7], further causing the computer apparatus to function as:

a second disappearer that causes the first character to disappear from the virtual space in a case where a status of the first character satisfying the predetermined condition as a result of the virtual battle satisfies a predetermined condition.

[9] The game program according to [7] or [8], further causing the computer apparatus to function as:
a first character appearer that causes a first character of the same type as the first character that has disappeared to appear at a position different from a position at which the first character was present when the first character has disappeared.

[10] The game program according to any one of [1] to [9], wherein the virtual battle is executed in a predetermined region, and
the computer apparatus is further caused to function as
a region changer that changes the predetermined region in accordance with an elapsed time period from the start of the virtual battle.

[11] A computer apparatus executing a game including a virtual battle between at least one player character operated by a player and at least two or more first characters, the computer apparatus comprising:
a virtual battle executer that executes the virtual battle between the player character and the first character; and
a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate a specific effect advantageous for the player character.

[12] A game control method for controlling, in a computer apparatus, game processing including a virtual battle between at least one player character operated by a player and at least two or more first characters, the game control method comprising:
a step of executing the virtual battle between the player character and the first character; and
a step of controlling the first character satisfying a predetermined condition as a result of the virtual battle to automatically execute, without moving in a virtual space together with the player character, a specific action that is an action different from before a start of the virtual battle and is advantageous for the player character, or controlling the first character satisfying the predetermined condition as a result of the virtual battle to automatically generate, without moving in the virtual space together with the player character, a specific effect advantageous for the player character.

[13] A game program executed in a server apparatus of a game system that includes a terminal apparatus and the server apparatus capable of communicating with the terminal apparatus, and executes a game including a virtual battle between at least one player character operated by a player and at least two or more first characters, the game program causing the server apparatus to function as:
a virtual battle executer that executes the virtual battle between the player character and the first character; and
a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate, without moving in the virtual space together with the player character, a specific effect advantageous for the player character.

[14] A computer apparatus on which the game program according to [13] is installed.

[15] A game system that includes a terminal apparatus and a server apparatus capable of communicating with the terminal apparatus, and executes a game including a virtual battle between at least one player character operated by a player and at least two or more first characters, the game system comprising:
a virtual battle executer that executes the virtual battle between the player character and the first character; and
a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate, without moving in the virtual space together with the player character, a specific effect advantageous for the player character.

[16] A game program executed in a terminal apparatus of a game system that includes the terminal apparatus and a server apparatus capable of communicating with the terminal apparatus, and executes a game including a virtual battle between at least one player character operated by a player and at least two or more first characters, the game program causing the terminal apparatus to function as:
a virtual battle executer that executes the virtual battle between the player character and the first character; and
a first character controller that controls the first character satisfying a predetermined condition as a result of the virtual battle to automatically execute, without moving in a virtual space together with the player character, a specific action that is an action different from before a start of the virtual battle and is advantageous for the player character, or controls the first character satisfying the predetermined condition as a result of the virtual battle to automatically generate, without moving in the virtual space together with the player character, a specific effect advantageous for the player character.

[17] A terminal apparatus on which the game program according to [16] is installed.

[18] A game control method for controlling game processing in a server apparatus of a game system that includes a terminal apparatus and the server apparatus capable of communicating with the terminal apparatus, and executes a game including a virtual battle between at least one player character operated by a player and at least two or more first characters, the game control method comprising:
a step of executing the virtual battle between the player character and the first character; and
a step of controlling the first character satisfying a predetermined condition as a result of the virtual battle to automatically execute, without moving in a virtual space together with the player character, a specific action that is an action different from before a start of the virtual battle and is advantageous for the player character, or controlling the first character satisfying the predetermined condition as a result of the virtual battle to automatically generate, without moving in the virtual space together with the player character, a specific effect advantageous for the player character.

[19] A game control method for controlling game processing in a game system that includes a terminal apparatus and a server apparatus capable of communicating with the terminal apparatus, and executes a game including a virtual battle between at least one player character operated by a player and at least two or more first characters, the game control method comprising:

a step of executing the virtual battle between the player character and the first character; and a step of controlling the first character satisfying a predetermined condition as a result of the virtual battle to automatically execute, without moving in a virtual space together with the player character, a specific action that is an action different from before a start of the virtual battle and is advantageous for the player character, or controlling the first character satisfying the predetermined condition as a result of the virtual battle to automatically generate, without moving in the virtual space together with the player character, a specific effect advantageous for the player character.

REFERENCE SIGNS LIST

1 COMPUTER APPARATUS
2 COMMUNICATION NETWORK
3 SERVER APPARATUS
4 SYSTEM
5 TERMINAL APPARATUS
11 CONTROL UNIT
12 RAM
13 STORAGE
14 SOUND PROCESSOR
15 GRAPHICS PROCESSOR
16 EXTERNAL STORAGE MEDIUM READING UNIT
17 COMMUNICATION INTERFACE
18 INTERFACE UNIT
20 INPUT UNIT
21 SOUND OUTPUT APPARATUS
22 DISPLAY APPARATUS
23 DISPLAY SCREEN
24 EXTERNAL STORAGE MEDIUM
31 CONTROL UNIT
32 RAM
33 STORAGE
34 COMMUNICATION INTERFACE
500 CONTROL MASTER TABLE

The invention claimed is:

1. A non-transitory computer-readable recording medium comprising a game program executed in a server apparatus of a game system that includes a terminal apparatus and the server apparatus capable of communicating with the terminal apparatus, and executes a game including a virtual battle between at least one player character operated by a player, another player character operated by another player and an automatically controlled character controlled by the game program, the game program causing the server apparatus to function as:

a virtual battle executer that executes the virtual battle between the player character and the automatically controlled character; and an automatically controlled character controller that controls the automatically controlled character satisfying a predetermined condition as a result of the virtual battle to follow the player character and automatically execute a specific action that is advantageous for the player character, or controls the automatically controlled character satisfying the predetermined condition as a result of the virtual battle to follow the player character and automatically generate a specific effect advantageous for the player character, wherein the specific action that is advantageous for the player character includes an attack action on the other player character or a support action on the player character, and the specific effect advantageous for the player character includes displaying the other player character within a first predetermined range with a visual indicator or decreasing a parameter of the other player character within a second predetermined range.

2. The non-transitory computer-readable recording medium according to claim 1, wherein the automatically controlled character controller controls the automatically controlled character to automatically execute the specific action within only a predetermined period from satisfaction of the predetermined condition by the automatically controlled character, or controls the automatically controlled first character to automatically generate the specific effect within only the predetermined period.

3. The non-transitory computer-readable recording medium according to claim 1 further causing the computer apparatus to function as:

a virtual space setter that newly sets the virtual space to be used in the game each time the game is played.

4. The non-transitory computer-readable recording medium according to claim 1, wherein in a case where the other player character is positioned within a third predetermined range, the specific action is attacking the other player character by the automatically controlled character.

5. The non-transitory computer-readable recording medium according to claim 1, wherein the specific effect is displaying an indicator corresponding to the other player character on a map illustrating a state of the virtual space.

6. The non-transitory computer-readable recording medium according to claim 1, wherein the specific action and/or the specific effect varies depending on a type of the automatically controlled character.

7. A game system that includes a terminal apparatus and a server apparatus capable of communicating with the terminal apparatus, and executes a game including a virtual battle between at least one player character operated by a player, another player character operated by another player and an automatically controlled character controlled by a game program, the game system comprising:

a virtual battle executer that executes the virtual battle between the player character and the automatically controlled character; and an automatically controlled character controller that controls the automatically controlled character satisfying a predetermined condition as a result of the virtual battle to follow the player character and automatically execute a specific action that is advantageous for the player character, or controls the automatically controlled character satisfying the predetermined condition as a result of the virtual battle to follow the player character and automatically generate a specific effect advantageous for the player character, wherein the specific action that is advantageous for the player character includes an attack action on the other player character or a support action on the player character, and the specific effect advantageous for the player character includes displaying the other player character within a first predetermined range with a visual indicator or decreasing a parameter of the other player character within a second predetermined range.

8. A non-transitory computer-readable recording medium comprising a game program executed in a terminal apparatus of a game system that includes the terminal apparatus and a server apparatus capable of communicating with the terminal apparatus, and executes a game including a virtual battle between at least one player character operated by a player, another player character operated by another player and an automatically controlled character controlled by the game program, the game program causing the terminal apparatus to function as:
- a virtual battle executer that executes the virtual battle between the player character and the automatically controlled character; and
- an automatically controlled character controller that controls the automatically controlled character satisfying a predetermined condition as a result of the virtual battle to follow the player character and automatically execute a specific action that is advantageous for the player character, or controlling the automatically controlled character satisfying the predetermined condition as a result of the virtual battle to follow the player character and automatically generate a specific effect advantageous for the player character,
- wherein the specific action that is advantageous for the player character includes an attack action on the other player character or a support action on the player character, and
- the specific effect advantageous for the player character includes displaying the other player character within a first predetermined range with a visual indicator or decreasing a parameter of the other player character within a second predetermined range.

9. The non-transitory computer-readable recording medium according to claim 1, further causing the server apparatus to function as:
- a first disappearer that causes the automatically controlled character to disappear from the virtual space after the automatically controlled character automatically executes the specific action, or after the automatically controlled character automatically generates the specific effect.

10. The non-transitory computer-readable recording medium according to claim 1, further causing the server apparatus to function as:
- a second disappearer that causes the automatically controlled character to disappear from the virtual space in a case where a status of the automatically controlled character satisfying the predetermined condition as a result of the virtual battle satisfies a predetermined condition.

11. The non-transitory computer-readable recording medium according to claim 9, further causing the server apparatus to function as:
- an automatically controlled character appearer that causes an automatically controlled character of the same type as the automatically controlled character that has disappeared to appear at a position different from a position at which the automatically controlled character was present when the automatically controlled character has disappeared.

12. The non-transitory computer-readable recording medium according to claim 1,
- wherein the virtual battle is executed in a predetermined region, and
- the server apparatus is further caused to function as
  - a region changer that changes the predetermined region in accordance with an elapsed time period from the start of the virtual battle.

13. The non-transitory computer-readable recording medium according to claim 1,
- wherein the predetermined condition is causing a predetermined parameter of the automatically controlled character to become less than or equal to a predetermined value and executing a predetermined action on the automatically controlled character.

* * * * *

UNITED STATES PATENT AND TRADEMARK OFFICE
CERTIFICATE OF CORRECTION

PATENT NO. : 11,951,396 B2
APPLICATION NO. : 17/295678
DATED : April 9, 2024
INVENTOR(S) : S. Ichikawa It is certified that error appears in the above-identified patent and that said Letters Patent is hereby corrected as shown below:

In the Claims

Column 28, Line 17 (Claim 2, Line 8), please change "controlled first" to -- controlled --.

Signed and Sealed this
Eighth Day of October, 2024

Katherine Kelly Vidal
*Director of the United States Patent and Trademark Office*